United States Patent
Laferte et al.

(10) Patent No.: US 8,906,192 B2
(45) Date of Patent: Dec. 9, 2014

(54) POLYURETHANE WITH POLYETHER AND POLYESTER BLOCKS AND ALKOXYSILANE END GROUP

(75) Inventors: Olivier Laferte, Trosly-Breuil (FR); Stephane Fouquay, Mont Saint Aignam (FR); Regis Guillotte, Ribecourt Dreslincourt (FR)

(73) Assignee: Bostik S.A., Courbevoie (FR)

( * ) Notice: Subject to any disclaimer, the term of this patent is extended or adjusted under 35 U.S.C. 154(b) by 125 days.

(21) Appl. No.: 13/332,454

(22) Filed: Dec. 21, 2011

(65) Prior Publication Data
US 2012/0160413 A1 Jun. 28, 2012

(30) Foreign Application Priority Data

Dec. 22, 2010 (FR) ...................................... 10 61053

(51) Int. Cl.
C09J 175/06 (2006.01)
C09J 175/08 (2006.01)
C08G 18/10 (2006.01)
C08G 18/42 (2006.01)
C08G 18/48 (2006.01)

(52) U.S. Cl.
USPC ................ 156/331.7; 156/331.1; 525/440.03; 528/26; 528/29

(58) Field of Classification Search
USPC ............... 525/440.03; 528/26, 29; 156/331.1, 156/331.7
See application file for complete search history.

(56) References Cited

U.S. PATENT DOCUMENTS

| 4,345,053 | A | 8/1982 | Rizk et al. | |
| 7,635,743 | B2 * | 12/2009 | Wintermantel et al. | ........ 528/59 |
| 2006/0247369 | A1 | 11/2006 | Griswold et al. | |
| 2007/0100108 | A1 | 5/2007 | Huang et al. | |
| 2008/0057316 | A1 * | 3/2008 | Landon et al. | ............. 428/423.1 |
| 2008/0114098 | A1 | 5/2008 | Griswold et al. | |
| 2010/0204384 | A1 | 8/2010 | Huang et al. | |

FOREIGN PATENT DOCUMENTS

WO   WO 2007/050426 A1   5/2007

OTHER PUBLICATIONS

Search Report of FR 1061053 (Oct. 3, 2011).

* cited by examiner

*Primary Examiner* — Rabon Sergent
(74) *Attorney, Agent, or Firm* — Millen, White, Zelano & Branigan, P.C.

(57) ABSTRACT

Preparing a polyurethane with polyurethane-polyether and polyurethane-polyester blocks with at least 2 polyurethane-polyester end blocks joined to an alkoxysilane end group, by reaction of a polyether polyol (A) with a stoichiometric excess of an aliphatic diisocyanate (B), then reaction of the polyurethane formed with a stoichiometric excess of a polyester polyol, then reaction of the polyurethane formed with a stoichiometric amount of an isocyanatosilane (D); polyurethane formed by said method;
  corresponding adhesive composition, further comprising a crosslinking catalyst
  method of assembly of 2 substrates employing the composition.

14 Claims, No Drawings

POLYURETHANE WITH POLYETHER AND POLYESTER BLOCKS AND ALKOXYSILANE END GROUP

The present invention relates to a polyurethane with polyether and polyester blocks and alkoxysilane end group, which after crosslinking displays high cohesion, suitable for use as adhesive or mastic, notably as hot-melt adhesive.

Polymers with alkoxysilane end group, for which said group is joined, directly or indirectly, to a main chain that consists of a polyether chain, are known.

Generally known in the field of adhesives by the designation MS polymers (for Modified Silane), said polymers are available commercially notably from the company Kaneka. With a molecular weight generally between 10 and 50 kDa, these polymers, generally liquid, are widely used in many fields of industry and everyday life for assembly by gluing of a great variety of objects (also called substrates) which can be constituted of the most varied materials.

Such a polymer is first applied, together with a catalyst and in the form of an adhesive layer, on at least one of the 2 surfaces that belong respectively to the 2 substrates to be assembled and which are intended to be brought into contact with one another during assembly. After bringing the 2 substrates into contact and application, if necessary, of pressure on their faying surface, the polymer reacts with water that is in the environment in the form of atmospheric humidity or moisture supplied by said substrates.

This reaction, called crosslinking, leads after its completion to the formation of an adhesive joint between the 2 substrates which is constituted of the polymer crosslinked in a three-dimensional network formed by the polymer chains joined together by bonds of the siloxane type. This joint ensures solidity of the assembly of the 2 substrates thus obtained.

However, the mechanical properties of crosslinked MS polymers, notably their cohesion, are generally insufficient for many applications, corresponding to those for which the adhesive joint must be capable of withstanding large stresses.

Moreover, definitive cohesion of the adhesive joint is only obtained after completion of the crosslinking reaction, i.e. after a certain time (called the time for increase in cohesion or setting time), during which the assembly cannot be comfortably manipulated or even must sometimes be held by mechanical clamping means (for example clamps or braces). The MS polymers consequently have the drawback of absence of green strength or of very inadequate green strength. The term "green strength" means the capacity of an adhesive to provide immediately, once the 2 substrates are brought into contact during their assembly by gluing, suitable cohesion of the adhesive joint that avoids the drawbacks observed during the setting time.

To overcome these drawbacks it is therefore often necessary, in practice, to employ MS polymers in the form of adhesive compositions which further comprise additives with a reinforcing effect (for example mineral fillers), or are intended to improve the green strength (for example waxes).

The aim of the invention is therefore to propose polymers with alkoxysilane end group, which lead after crosslinking to an adhesive joint displaying improved mechanical properties, and notably displaying greater cohesion.

Another aim of the invention is to propose polymers with alkoxysilane end group, which have improved green strength.

It has now been found that these aims can be achieved, completely or partly, with the polyurethanes for which the method of production is described below.

The invention therefore relates firstly to a method of preparing a polyurethane with polyurethane-polyether and polyurethane-polyester blocks comprising at least 2 end blocks each consisting of a polyurethane-polyester block joined to an alkoxysilane end group, said method comprising the sequential steps of:

(i) reaction of a mixture of alcohols comprising a polyether polyol (A) with a stoichiometric excess of an aliphatic diisocyanate (B), to form a polyurethane-polyether block possessing at least 2 —NCO end groups, then (ii) reaction of the polyurethane from step (i) with a stoichiometric excess of a polyester polyol (C), to form a polyurethane with polyurethane-polyether and polyurethane-polyester blocks comprising at least 2 end blocks each consisting of a polyurethane-polyester block joined to an —OH end group, then (iii) reaction of the polyurethane with —OH end group from step (ii) with a stoichiometric amount of an isocyanatosilane (D).

It has now been found that application of the method according to the invention leads to the formation of a polyurethane that is homogeneous and thermally stable.

The polyurethane thus obtained forms, after crosslinking by atmospheric moisture in the presence of a suitable catalyst, an adhesive joint that has values of cohesion greater than that obtained for crosslinked MS polymers, and generally above 3 MPa. Such values of cohesion mean it can be used as structural or semi-structural adhesive, for example as seals on the usual substrates (concrete, glass, marble) in the building industry, or for gluing windows in the automobile and shipbuilding industry.

Moreover, the polyurethane thus obtained is a thermoplastic polymer (in an anhydrous environment) whose melting point (measured by differential scanning calorimetry) is between 30 and 120° C., preferably between 30 and 90° C. It can therefore be used as hot-melt adhesive and applied hot on the interface of the substrates to be assembled. As a result of room-temperature solidification, an adhesive joint is thus immediately created between the substrates, endowing the adhesive with advantageous properties of green strength.

The mixture of alcohols used in step (i) comprises one or more polyether polyols (A).

The polyether polyols (A) are generally selected from aliphatic and aromatic polyether polyols. Preferably, their molecular weight is between 0.5 and 20 kDa and their hydroxyl functionality is between 2 and 4.6. The hydroxyl functionality is the average number of hydroxyl functions per mole of polyether polyol. The molecular weight stated is a number-average molecular weight (generally designated Mn); the same applies to all the molecular weights stated for polymers in the present text, unless stated otherwise.

As examples of aliphatic polyether polyols, we may mention the alkoxylated derivatives of:
  diols (such as ethylene glycol, propylene glycol, neopentyl glycol), of
  triols (such as glycerol, trimethylolpropane and hexane-1,2,6-triol), or of
  tetrols (such as pentaerythritol).
These products are widely available commercially.

According to a preferred variant, the polyether polyol (A) used in step (i) is a polyether diol alone or mixed with up to 30 wt. % of a polyether triol.

The polyether polyol (A) is selected, more preferably, from the polypropylene glycols (or PPG) of hydroxyl functionality equal to 2 or 3 among which we may mention:

Voranol® EP 1900 which is a bifunctional PPG with a molecular weight of about 3800 Da, and of hydroxyl value $I_{OH}$ equal to 28 mg KOH/g;

Voranol® CP 755 which is a trifunctional PPG with a molecular weight of about 700 Da and with hydroxyl value $I_{OH}$ equal to 237 mg KOH/g; both available from the company Dow.

According to a particularly advantageous variant, a polypropylene glycol diol or triol whose polymolecularity index varies from 1 to 1.4 is used as polyether polyol (A).

The polymolecularity index is the ratio of the weight-average molecular weight to the number-average molecular weight. These polypropylene glycols are available commercially under the brand name ACCLAIM® from the company Bayer. We may mention, as examples of these trifunctional PPGs, ACCLAIM® 6300 which has a molecular weight of about 6000 Da and an $I_{OH}$ equal to 28.3 mg KOH/g, and as examples of bifunctional PPGs:

ACCLAIM® 8200 N with a molecular weight of 8000 Da and $I_{OH}$ equal to 13.5 mg KOH/g, ACCLAIM® 12200 with a molecular weight of 12000 Da, and $I_{OH}$ equal to 10 mg KOH/g, ACCLAIM® 18200 with a molecular weight of 18000 Da, and $I_{OH}$ equal to 6.5 mg KOH/g.

The mixture of alcohols used in step (i) can further comprise one or more chain extenders, selected from diols and polyamines with a molecular weight of between 60 and 500 Da.

As examples of said diols, we may mention ethylene glycol, propylene glycol, diethylene glycol, dipropylene glycol, methyl-3-propanediol-1,5, 1,4-butanediol, 1,6-hexanediol, 2-ethyl-1,3-hexanediol, N,N-bis(hydroxy-2-propyl)aniline, 3-methyl-1,5-pentanediol.

As examples of said polyamines, we may mention ethylene diamine, diphenyl methane diamine, isophorone diamine, hexamethylene diamine, diethyltoluene diamine.

In accordance with step (i) of the method according to the invention, at least one polyether polyol described above is reacted with a diisocyanate (B) of formula:

$$NCO-R^1-NCO \qquad (I)$$

in which $R^1$ represents a divalent aliphatic or aromatic hydrocarbon radical comprising from 5 to 15 carbon atoms, which can be linear, branched or cyclic.

$R^1$ is advantageously selected from one of the following divalent radicals whose formulae given below show the 2 free valences:

a) the divalent radical derived from isophorone:

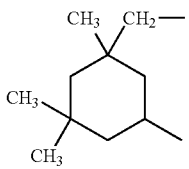

b)

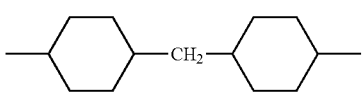

c) —(CH$_2$)$_6$— (or hexamethylene radical)

d)

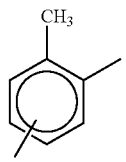

e)

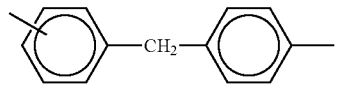

In the present step (i) of the method according to the invention, the polyether polyol (A) is reacted with an excess, in terms of equivalent functional group, of the aliphatic diisocyanate (B), of formula (I). This signifies that the amounts of the 2 reactants used in step (i) correspond to an excess of the equivalent number of —NCO groups (present in the amount of diisocyanate) relative to the equivalent number of —OH groups (present in the amount of polyether polyol(s) (A)) increased, if necessary, by the equivalent number of —OH, —NH$_2$, and/or —NH— groups present in the diol and/or diamine used as chain extender.

Preferably, these quantities correspond to an —NCO/—OH equivalent ratio between 1.3 and 5. Said ratio is defined as being equal to the equivalent number of —NCO groups divided by the equivalent number of —OH, —NH$_2$, and/or —NH— groups acting as the functional groups carried by the corresponding amounts of the 2 reactants, namely diisocyanate on the one hand and on the other hand the mixture of polyether polyols comprising if necessary a chain extender. The amounts by weight of the reactants to be put in the reactor are determined on the basis of this ratio, as well as, in the case of polyether polyols, on the basis of their hydroxyl index $I_{OH}$. The hydroxyl index $I_{OH}$ is the number of hydroxyl functions per gram of polyether polyol, said number being expressed, in particular in the present text, in the form of the equivalent number of milligrams of KOH used in determination of the hydroxyl functions.

It is preferable to carry out step (i) in the presence of a catalyst, selected for example from the organotins or bismuth/zinc carboxylates, and by introducing the appropriate amount of diisocyanate (B) in the appropriate amount of polyether polyol (A) already loaded in the reactor. The reaction is carried out at a temperature between 70 and 100° C.

The polyurethane-polyether block with —NCO end groups formed at the end of step (i) is reacted with a polyester polyol (C), in accordance with step (ii) of the method according to the invention.

The polyester polyols (C) are selected from aliphatic and aromatic polyester polyols, and the mixtures of these compounds. Preferably, their molecular weight is between 1 and 10 kDa, preferably between 2 and 6 kDa, and their hydroxyl functionality can vary from 2 to 4. As examples, we may mention:

polyester polyols of natural origin such as castor oil;
polyester polyols resulting from the condensation:
of one or more aliphatic polyols (linear, branched or cyclic) or aromatic polyols such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and the mixtures of these compounds, with one or more polycarboxylic acids or the ester or anhydride derivative thereof such as 1,6-hexanedioic acid, dodecanedioic acid, azelaic acid, sebacic acid, adipic acid, 1,18-octadecanedioic acid, phthalic acid, succinic acid and the mixtures of these acids, an unsaturated anhydride such as maleic or phthalic anhydride, or a lactone such as caprolactone.

Many of these products are available commercially.

Among the polyester polyols (C) that can be used, we may thus mention the following products with hydroxyl functionality equal to 2:

TONE® 0240 (available from Union Carbide) which is a polycaprolactone with a molecular weight of about 2000 Da, with $I_{OH}$ equal to 56, having a melting point of about 50° C., DYNACOLL® 7381 with a molecular weight of about 3500 Da, with $I_{OH}$ equal to 30, having a melting point of about 65° C., DYNACOLL® 7360, which results from the condensation of adipic acid with hexanediol, with a molecular weight of about 3500 Da, an $I_{OH}$ equal to 30 and a melting point of about 55° C., DYNACOLL® 7330 with a molecular weight of about 3500 Da, with $I_{OH}$ equal to 30, having a melting point of about 85° C., DYNACOLL® 7363, which also results from the condensation of adipic acid with hexanediol, with a molecular weight of about 5500 Da, an $I_{OH}$ equal to 21 and a melting point of about 57° C.

The aforementioned DYNACOLL® products are marketed by the company EVONIK.

Preferably, a polycaprolactone, castor oil or a polyester polyol resulting from the condensation of ethanediol, 1,3-propanediol and/or 1,6-hexanediol with adipic acid and/or phthalic acid, are used as polyester polyol.

In step (ii) of the method according to the invention, it is preferable to employ one or more polyester polyols having an —OH functionality in the range from 2 to 3, a functionality of 2 being more particularly preferred.

In the present step (ii) of the method according to the invention, the polyurethane formed in step (i) is reacted with an excess of polyester polyol (C) in terms of equivalent functional group. Preferably the amounts of reactants used correspond to an —NCO/—OH equivalent ratio between 0.10 and 0.80, said equivalent ratio being defined as above. The amounts by weight of reactants to be loaded in the reactor are determined on the basis of this ratio, as well as, in the case of the polyester polyols, on the basis of their hydroxyl index $I_{OH}$ whose definition is identical, mutatis mutandis, to that given above for the polyether polyols.

In step (ii), it is preferable to employ a polyester polyol (C) having a melting point greater than or equal to 55° C., corresponding to a marked crystallinity. The green strength of the polyurethane obtained at the end of the method according to the invention is then improved advantageously.

Step (ii) is preferably carried out by adding the appropriate amount of polyester polyol (C) to the appropriate amount of polyurethane formed in step (i) already loaded in the reactor. The reaction is carried out at a temperature between 70 and 110° C.

According to step (iii) of the method according to the invention, the polyurethane with —OH end group that is formed at the end of step (ii) is reacted with an isocyanatosilane (D) of formula:

$$NCO—R^2—Si(R^3)_p(OR^4)_{3-p} \tag{II}$$

in which:

$R^2$ represents a divalent linear alkylene radical comprising 1 to 3 carbon atoms;

$R^3$ and $R^4$, which may be identical or different, each represent a linear or branched alkyl radical with 1 to 4 carbon atoms, with the possibility when there are several radicals $R^3$ (or $R^4$) that the latter are identical or different;

p is an integer equal to 0, 1 or 2.

The isocyanatosilanes of formula (II) are widely available commercially. We may mention, as examples, the gamma-isocyanato-n-propyl-trimethoxysilane that is available under the designation Geniosil® GF 40 or the alpha-isocyanato-methyl-dimethoxymethylsilane that is available under the trade name Geniosil® XL 42, both from the company Wacker.

The amounts of isocyanatosilane and of polyurethane with —OH end group formed in step (ii) that are used in the present step (iii) correspond advantageously to an —NCO/—OH equivalent ratio between 0.95 and 1.05. Step (iii) is carried out at a temperature of about 100° C.

At the end of step (iii), a final polyurethane with polyurethane-polyether and polyurethane-polyester blocks is obtained comprising at least 2 end blocks each consisting of a polyurethane-polyester block joined to an alkoxysilane end group. Said final polyurethane has a molecular weight (Mn) in the range from 10 to 40 kDa, preferably from 15 to 30 kDa, corresponding to a polymolecularity index varying from about 2 to 5. The viscosity at 100° C. (measured with a Brookfield RTV viscosimeter) of said final polyurethane can vary over a wide range, between 3 and 300 Pa·s.

According to a preferred variant of the method according to the invention, the mixture of alcohols used in step (i) comprises at least 80 wt. % of a polypropylene glycol diol or triol (A) whose polymolecularity index varies from 1 to 1.4; and the polyester polyol (C) used in step (ii) has a melting point greater than or equal to 55° C.

In the case of this variant, after crosslinking in the presence of a suitable catalyst, a product is obtained that displays, in tensile testing, an elongation at break at least equal to 250%, corresponding to a particularly elastic adhesive joint, able for example to withstand vibratory mechanical stresses in an assembly. Such properties are appreciated notably for use in the area of means of transport (such as motor vehicles, buses, lorries, or trains or ships).

The invention also relates to a polyurethane with polyurethane-polyether and polyurethane-polyester blocks comprising at least 2 end blocks each consisting of a polyurethane-polyester block joined to an alkoxysilane end group, said polyurethane being obtainable by the method that is also an object of the invention, as described above.

The invention also relates to an adhesive composition comprising polyurethane according to the invention and from 0.01% to 3% of a crosslinking catalyst, preferably from 0.1 to 1%.

The crosslinking catalyst usable in the composition according to the invention can be any catalyst known by a person skilled in the art for the condensation of silanol. We may mention as examples of such catalysts:

organic derivatives of titanium such as titanium acetylacetonate (available commercially under the designation TYZOR® AA75 from the company DuPont), organic derivatives of aluminium such as aluminium chelate (available commercially under the designation K-KAT® 5218 from the company King Industries), organic derivatives of tin such as dibutyl tin laurate (or DBTL), amines such as 1,8-diazobicyclo (5.4.0) undecene-7 or DBU.

UV stabilizers such as amines, antioxidants or compatible tackifying resins can also be included in the composition according to the invention.

The antioxidants can include primary antioxidants that trap free radicals and are generally substituted phenols such as Irganox® 1010 from CIBA. The primary antioxidants can be used alone or in combination with other antioxidants such as phosphites such as Irgafos® 168 also from CIBA.

With regard to the tackifying resin or resins optionally included in the composition according to the invention, the term "compatible tackifying resin" means a tackifying resin which, when it is mixed in proportions of 50%/50% with the polymer according to the invention, gives a substantially homogeneous mixture.

These tackifying resins are advantageously selected from:
(i) resins obtained by polymerization of terpene hydrocarbons and of phenols, in the presence of Friedel-Crafts catalysts;
(ii) resins obtained by a method comprising polymerization of alpha-methylstyrene, where said method can also comprise a reaction with phenols;
(iii) rosins of natural origin or modified, for example the rosin extracted from pine gum, wood rosin extracted from tree roots and derivatives thereof that have been hydrogenated, dimerized, polymerized or esterified by monohydric alcohols or polyols, such as glycerol or pentaerythritol;
(iv) resins obtained by hydrogenation, polymerization or copolymerization (with an aromatic hydrocarbon) of mixtures of unsaturated aliphatic hydrocarbons having about 5, 9 or 10 carbon atoms obtained from petroleum cuts;
(v) terpene resins, generally resulting from the polymerization of terpene hydrocarbons for example mono-terpene (or pinene) in the presence of Friedel-Crafts catalysts;
(vi) copolymers based on natural terpenes, for example styrene/terpene, alpha-methylstyrene/terpene and vinyl toluene/terpene; or else
(vii) acrylic resins having a viscosity at 100° C. of less than 100 Pa·s.

The composition according to the invention can further comprise other (co)polymers selected for example from:
copolymers of ethylene and vinyl acetate (EVA),
acrylic polymers,
amorphous poly-alpha olefins (commonly denoted by the acronym APAO), and preferably the reactive amorphous poly-alpha olefins (called APAOR) grafted with alkoxysilyl groups,
styrene block copolymers such as Styrene-Isoprene-Styrene (SIS),
polyethylene, polypropylene, polyamides or polyesters.

The composition according to the invention is preferably, prior to its end use, packed in air-tight packaging to protect it from environmental moisture. Said packaging can advantageously consist of aluminium, of high-density polyethylene or of polyethylene coated with aluminium foil. A cylindrical cartridge is one embodiment of a said packaging.

The invention finally relates to a method of assembly of 2 substrates comprising:
melting the adhesive composition as defined above, by heating at a temperature between 30 and 120° C., then
coating it, in the form of a layer with thickness between 0.3 and 5 mm, preferably between 1 and 3 mm, on at least one of the 2 surfaces belonging respectively to the 2 substrates to be assembled and which are intended to be brought into contact with one another during assembly on a faying surface, then, without exceeding a period of time corresponding to the maximum open assembly time of the adhesive composition,
bringing the 2 substrates into effective contact on their faying surface.

The maximum open assembly time is the interval of time after which a layer of adhesive applied on a substrate loses its capacity to attach said substrate to another substrate by gluing.

Suitable substrates are, for example, inorganic substrates such as glass, ceramic, concrete, metals or alloys (such as aluminium, steel, non-ferrous metals, galvanized metals); or else organic substrates such as wood, plastics such as PVC, polycarbonate, PMMA, polyethylene, polypropylene, polyesters, epoxy resins; metal substrates and composites coated with paint (such as in the automotive industry).

The following examples are given purely for illustrating the invention and are not to be interpreted as limiting its scope.

EXAMPLE 1

A) Preparation of a Polyurethane According to the Invention:

Step (i): Synthesis of a polyurethane comprising two —NCO end groups and one or more polyether blocks:

38.96 g of polyether polyol Acclaim® 8200 N having a hydroxyl number of 13.5 mg KOH per g (corresponding to an equivalent number of —OH functions equal to 0.241 mmol/g) is put in a 250 ml closed reactor, equipped with a stirrer, heating means, a thermometer and connected to a vacuum pump. The whole is heated to 80° C. and held at reduced pressure of 20 mbar for 1 hour to dehydrate the polyether polyol.

Then 4.2 mg of a bismuth/zinc carboxylate catalyst (Borchi® Kat VP0244 from the company Borchers GmbH) and 2.95 g of isophorone diisocyanate (titrating 37.6% w/w of —NCO groups), the amounts introduced thus corresponding to an NCO/OH ratio equal to 2.8, are introduced into the reactor maintained at atmospheric pressure and heated to a temperature of 90° C. The polyaddition reaction is continued for 4 hours until 41.94 g of a polyurethane is obtained having a content of —NCO (monitored by potentiometric titration with an amine) equal to 0.406 mmol/g, which corresponds to complete consumption of the hydroxyl functions of the polyether polyol.

Step (ii): Synthesis of a polyurethane with polyether and polyester blocks comprising 2 polyester end blocks each connected to an —OH end group:

58.90 g of a crystalline polyester diol Dynacoll® 7330 with number-average molecular weight of 3500 Da having a hydroxyl number of 30.9 mg KOH per g (corresponding to an equivalent number of —OH functions equal to 0.551 mmol/g) is put in a 250 ml closed reactor equipped with a stirrer, heating means, a thermometer and connected to a vacuum pump. The whole is heated to 105° C. and held at reduced pressure of 20 mbar for 1 hour to dehydrate the polyester polyol.

The reactor is then returned to atmospheric pressure and maintained under inert atmosphere for loading 0.5 g of antioxidant (Irganox® 245 from Ciba), 4.2 mg of the same catalyst as in step (i) and finally 41.90 g of the polyurethane obtained in step (i). The amounts of polyester diol and prepolymer obtained in step a) correspond to an NCO/OH ratio equal to 0.63.

The reactor is then put under reduced pressure of 20 mbar again and heated to a temperature of 100° C., and the polyaddition reaction is continued for 2.5 hours until complete consumption of the —NCO functions of the polyurethane from step a) (detected by disappearance of the —NCO band in infrared analysis).

101.30 g of polyurethane is obtained having a content of —OH functions of 0.153 mmol/g.

Step (iii): Synthesis of a polyurethane with polyether and polyester blocks comprising 2 polyester end blocks each joined to an alkoxysilyl end group:

3.16 g of gamma-isocyanato-n-propyl-trimethoxysilane (titrating 19.9% w/w of —NCO groups), corresponding to an NCO/OH ratio equal to 1, is put in the reactor from step b).

The reactor is then held under inert atmosphere at 100° C. for 1.5 h until completion of reaction (detected by disappearance of the —NCO band in infrared analysis).

104.57 g of a white product, solid at room temperature, is obtained.

Its viscosity in the molten state, measured with a Brookfield RTV viscosimeter (at 100° C. for a rotary speed of 20 rev/min and a No. 29 needle) is 32 000 mPa·s.

Its melting point measured by differential scanning calorimetry (DSC) is 81° C.

Its number-average molecular weight is 19596 Da and its weight-average molecular weight is 44523 Da, measured by size exclusion chromatography or GPC (gel permeation chromatography).

B) Corresponding Composition:

0.2 wt. % of a crosslinking catalyst consisting of dibutyltin dineodecanoate (available for example from the company TIB Chemicals) is put in the reactor from step iii).

The composition obtained is stirred at reduced pressure of 20 mbar for 15 minutes before being packed in an aluminium cartridge to avoid moisture.

The composition is then submitted to the following tests.

Measurement of Strength and Elongation at Break in the Tensile Test:

The measurement principle consists of stretching a standard test specimen, consisting of the crosslinked adhesive composition, in a tensile tester, the moving jaw of which moves at a constant speed of 100 mm/minute, and of recording, at the moment when breakage of the test specimen occurs, the tensile stress applied (in MPa) and the elongation of the test specimen (in %).

The standard test specimen is of dumb-bell shape, as illustrated in international standard ISO 37. The narrow part of the dumb-bell used has length of 20 mm, width of 4 mm and thickness of 500 µm.

To prepare the dumb-bell, the composition packaged as described above is heated to 100° C., then the amount necessary to form a film having a thickness of 500 µm is extruded onto an A4 sheet of siliconized paper, and is left for 2 weeks at 23° C. and 55% relative humidity for crosslinking. The dumb-bell is then obtained by simple cutting out from the crosslinked film.

The measurement results obtained are presented in Table 3.

Test for Measuring the Solidification Time of the Adhesive Composition:

This test is used for quantifying the green strength of the previously prepared adhesive composition.

Two identical rectangular pieces of wood (length 10 cm, width 2 cm and thickness 1 cm) are assembled by arranging them perpendicularly on a square contact zone with a 2-cm side located at their end. For this, the following procedure is followed.

The composition packaged as described above is heated to 100° C., so as to extrude a strand of glue with a diameter of 2 mm and a length of 2 cm, which is deposited parallel to the width of one of the 2 pieces roughly at the centre of the square zone with 2-cm side which is intended to be in contact with the other piece.

After depositing said strand, the 2 pieces are brought into contact and pressed manually so as to form, in their contact zone (defined as above), a layer of adhesive composition of thickness between 200 and 250 µm.

Once assembly has thus been carried out, the operator takes hold of the free end of the 2 pieces in each hand, and imposes a pivoting movement of small amplitude on the assembly, tending to open and close the right angle formed by the 2 pieces by a few degrees.

The solidification time is defined as being the length of time, counting from execution of assembly, after which the cohesion attained by the adhesive joint joining the 2 pieces together no longer permits the aforementioned pivoting movement.

The result is shown in Table 3.

EXAMPLES 2 TO 12

Example 1 A) is repeated, to prepare a polyurethane according to the invention:

but replacing, in step (i), Acclaim® 8200 N with a mixture of alcohols that comprises at least one polyether polyol (A), with the nature and content of ingredients (as % w/w) shown in Table 1, also replacing, in step (ii), Dynacoll® 7330 with the mixture of polyester polyols with the nature and content of ingredients (as % w/w) shown in Table 1, and using for the NCO/OH ratios in steps (i) and (ii), the values shown in Table 1.

The values obtained for melt viscosity, melting point and weight-average molecular weight are shown in Table 2.

Example 1 B) is repeated with each of the polyurethanes thus obtained.

The test results obtained for the corresponding compositions are presented in Table 3.

EXAMPLE 13

Comparative

An MS polymer is used that comprises 2 n-propyl dimethoxymethylsilane end groups joined directly to a main chain of the polypropylene glycol type, said polymer being obtained under the designation S 303H from the company Kaneka.

A composition consisting of 99.8% of this polymer and 0.2% of the crosslinking catalyst from example 1 B) is prepared by simple mixing, and is then packaged in an aluminium cartridge.

The tests described in example 1 B) are then repeated and the results obtained are presented in Table 3.

EXAMPLE 14

Comparative

Example 13 is repeated using an MS polymer consisting of 2 methoxysilane end groups connected indirectly to a main chain of the polypropylene glycol type by a unit comprising a urethane function. This polymer is obtained under the designation Geniosil® STP-E35 from the company Wacker.

The results obtained are also shown in Table 3.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| step (i) | Mixture of polyether polyol (A) and other alcohol (in %) | ACCLAIM® 8200 N | 100 | 100 | 100 | 100 | 90 | 100 | 98.6 | 90 | — | — | — | — |
| | | ACCLAIM® 6300 | — | — | — | — | 10 | — | — | — | — | — | — | — |
| | | Voranol® EP 1900 | — | — | — | — | — | — | — | — | 100 | 100 | 100 | 100 |
| | | Voranol® CP 755 | — | — | — | — | — | — | — | 10 | — | — | — | — |
| | | methyl-3 propane diol-1,5 | — | — | — | — | — | — | 1.4 | — | — | — | — | — |
| | | Ratio NCO/OH | 2.8 | 2.8 | 2.8 | 4.4 | 2.3 | 2.6 | 1.4 | 1.7 | 1.8 | 1.8 | 1.9 | 1.9 |
| step (ii) | Mixture of polyester polyol (C) (in %) | TONE® 0240 | — | — | — | 100 | — | — | — | — | — | — | — | — |
| | | DYNACOLL® 7381 | — | — | 100 | — | — | — | — | — | — | — | — | — |
| | | DYNACOLL® 7360 | — | 100 | — | — | — | — | — | — | — | — | — | — |
| | | DYNACOLL® 7330 | 100 | — | — | — | 100 | 20 | 100 | 100 | 50 | — | 50 | 100 |
| | | DYNACOLL® 7363 | — | — | — | — | — | 80 | — | — | 50 | 100 | 50 | — |
| | | Ratio NCO/OH | 0.52 | 0.52 | 0.52 | 0.61 | 0.45 | 0.75 | 0.29 | 0.39 | 0.13 | 0.32 | 0.59 | 0.53 |

TABLE 2

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Viscosity Brookfield RTV at 100° C. (in Pa·s) | 32 | 21 | 29.5 | 19.4 | 39.8 | 280 | 17.5 | 55 | 6.4 | 19.7 | 31.5 | 30.2 |
| Melting point (in °C.) | 81 | 52 | 63 | 36 | ND | ND | ND | ND | ND | ND | ND | ND |
| Number-average molecular weight (in Da) | 19 596 | ND | ND | ND | ND | ND | 17 926 | ND | ND | ND | 20 724 | ND |
| Polymolecularity index | 2.3 | ND | ND | ND | ND | ND | 4.1 | ND | ND | ND | 2.6 | ND |

ND = not determined

TABLE 3

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Breaking strength (in MPa) | 8.3 | 7.8 | 5.4 | 6.8 | 8.5 | 3.3 | 7.6 | 9.4 | 13.8 | 8.1 | 7.0 | 6.2 | 0.3 | 0.8 |
| Elongation at break (in %) | 679 | 582 | 554 | 558 | 668 | 287 | 615 | 379 | 11 | 178 | 31 | 53 | 110 | 140 |
| Solidification time | 12 s | 37 s | 17 s | 35 min | 7 s | 35 s | 12 s | 12 s | 7 s | 20 s | 17 s | 7 s | >24 hours | 1.5 hour |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 1061053, filed Dec. 22, 2010, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of preparing a polyurethane with polyurethane-polyether and polyurethane-polyester blocks comprising at least 2 end blocks each consisting of a polyurethane-polyester block joined to an alkoxysilane end group, said method comprising the sequential steps of:
   (i) reaction of a mixture of alcohols comprising a polyether polyol (A) with a stoichiometric excess of an aliphatic diisocyanate or an aromatic diisocyanate (B) of the formula:

NCO—R¹—NCO          (I)

in which R¹ represents a divalent aliphatic or aromatic hydrocarbon radical comprising 5 to 15 carbon atoms which is linear, branched or cyclic, to form a polyurethane-polyether block possessing at least 2 —NCO end groups, then
   (ii) reaction of the polyurethane from (i) with a stoichiometric excess of a polyester polyol (C), to form a polyurethane with polyurethane-polyether and polyurethane-polyester blocks comprising at least 2 end blocks each consisting of a polyurethane-polyester block joined to an —OH end group, then
   (iii) reaction of the polyurethane with —OH end group from (ii) with a stoichiometric amount of an isocyanatosilane (D).

2. The method of preparing a polyurethane according to claim 1, wherein the polyether polyol (A) used in (i) is a polyether diol alone or mixed with up to 30 wt. % of a polyether triol, relative to said mixture.

3. The method of preparing a polyurethane according to claim 1, wherein the polyether polyol (A) is a polypropylene glycol with hydroxyl functionality equal to 2 or 3.

4. The method of preparing a polyurethane according to claim 1, wherein a polypropylene glycol diol or triol whose polymolecularity index is from 1 to 1.4 is used as polyether polyol (A).

5. The method of preparing a polyurethane according to claim 1, wherein R¹ is one of the following divalent radicals whose formulae given below show the 2 free valences:
   a) a divalent radical derived from isophorone:

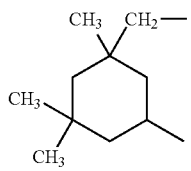

b)

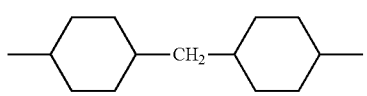

c)
   —(CH₂)₆— (or hexamethylene radical)

d)

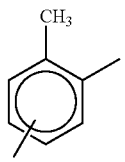

or
   e)

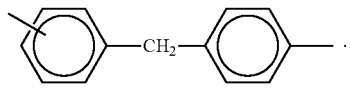

.

6. The method of preparing a polyurethane according to claim 1, wherein the amounts of the 2 reactants used in step (i) correspond to an —NCO/—OH equivalent ratio between 1.3:1 and 5:1.

7. The method of preparing a polyurethane according to claim 1, wherein one or more polyester polyols having an —OH functionality of 2 are used in step (ii).

8. The method of preparing a polyurethane according to claim 1, wherein the amounts of reactants used in step (ii) correspond to an —NCO/—OH equivalent ratio between 0.10:1 and 0.80:1.

9. The method of preparing a polyurethane according to claim 1, wherein a polyester polyol (C) having a melting point greater than or equal to 55° C. is used in step (ii).

10. The method of preparing a polyurethane according to claim 1, wherein the isocyanatosilane (D) has the formula:

NCO—R²—Si(R³)$_p$(OR⁴)$_{3-p}$          (II)

in which:
    R² represents a divalent linear alkylene radical comprising 1 to 3 carbon atoms;
    R³ and R⁴, which are identical or different, each independently represent a linear or branched alkyl radical with from 1 to 4 carbon atoms,
    p is an integer equal to 0, 1 or 2.

11. The method of preparing a polyurethane according to claim 1, wherein the mixture of alcohols used in step (i) comprises at least 80 wt. % based on the mixture of alcohols of a polypropylene glycol diol or triol (A) whose polymolecularity index is from 1 to 1.4; and the polyester polyol (C) used in step (ii) has a melting point greater than or equal to 55° C.

12. A polyurethane with polyurethane-polyether and polyurethane-polyester blocks comprising at least 2 end blocks each consisting of a polyurethane-polyester block joined to an alkoxysilane end group, said polyurethane being obtained by the method as defined in claim 1.

13. An adhesive composition comprising the polyurethane as defined in claim 12 and from 0.01% to 3% by weight based on the polyurethane of a crosslinking catalyst.

14. A method of assembly of 2 substrates comprising:
    melting the adhesive composition as defined in claim 13, by heating at a temperature between 30 and 120° C., then coating it, in the form of a layer of thickness between 0.3 and 5 mm, on at least one of the 2 surfaces belonging respectively to the 2 substrates to be assembled and which are intended to be brought into contact with one another during assembly on a faying surface, then, without exceeding a period of time corresponding to the maximum open assembly time of the adhesive composition, bringing the 2 substrates into effective contact on their faying surface.

* * * * *